W. MORGENSTERN, dec'd.

H. W. Putnam, Assignee by mesne assignments.

BOTTLE-STOPPERS.

No. 7,847. Reissued Aug. 14, 1877.

Witnesses.

Chas. H. Smith

Geo. T. Pinckney

Inventor

William Morgenstern.

Henry W. Putnam assignee for Lemuel W. Serrell

Atty

N. PETERS, PHOTO-LITHOGRAPHER, WASHINGTON, D. C.

UNITED STATES PATENT OFFICE.

HENRY W. PUTNAM, OF BENNINGTON, VERMONT, ASSIGNEE, BY MESNE ASSIGNMENTS, OF WILLIAM MORGENSTERN, DECEASED.

IMPROVEMENT IN BOTTLE-STOPPERS.

Specification forming part of Letters Patent No. 131,111, dated September 3, 1872; Reissue No. 7,847, dated August 14, 1877; application filed February 12, 1877.

*To all whom it may concern:*

Be it known that WILLIAM MORGENSTERN, late of the city and State of New York, did invent a new and Improved Bottle-Stopper, of which the following is a specification:

A stopper of rubber, or equivalent elastic material, is employed with a projection or head upon the upper part, in combination with a metallic plate having an opening through which such head passes, so that the two parts are connected together. The head, being larger than the opening in the plate, prevents the rubber stopper becoming separated from said plate under the ordinary circumstances of use.

Figure 1:
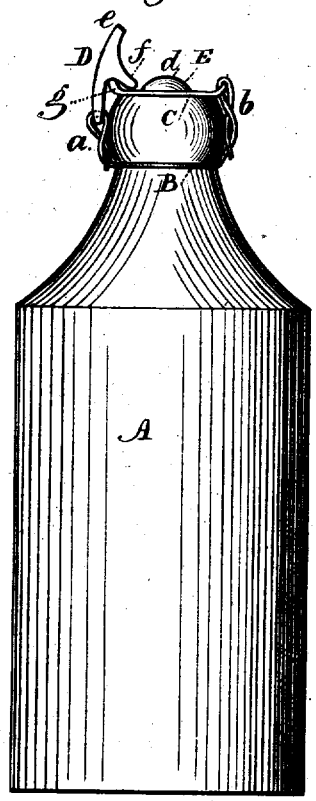
Figure 2:
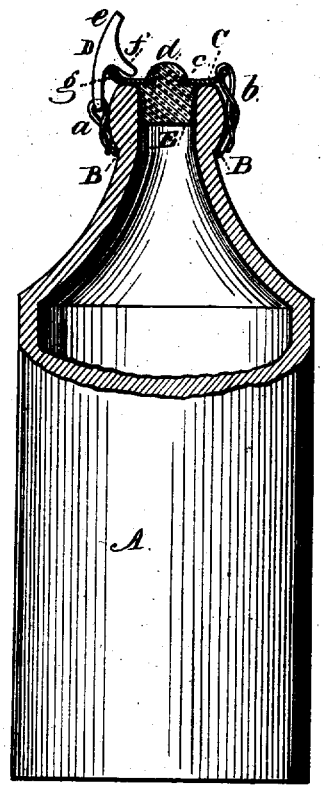

In the drawing, Figure 1 represents a side view of said bottle-stopper, and Fig. 2 is a vertical central section of the same.

A is a bottle or jar, around the neck of which is fastened a wire, B, which is represented as formed with two loops, *a b*, one opposite the other, and previous to twisting the wire, so as to form said loops, it is passed through an eye in the supporting-plate C, and also through an eye in the cam-shaped catch, D, and when the loops *a b* are completed they form the hinges for said plate and catch.

The supporting-plate is provided with a central hole to receive the head *d* of the stopper E, which stopper is made of india-rubber, or other soft and elastic material, so that its head, when forced through the hole in the supporting-plate, is the means for attaching the rubber to the plate, and the edge of the plate, engaging with the recess *c*, retains the stopper firmly in position.

By this arrangement I am enabled to remove the stoppers, if the same are worn out, and to replace them by new ones with ease and facility.

The catch D is represented as formed with thumb-piece *e*, and with a cam-shaped nose, *f*, which, when pressed over a raised lip, *g*, formed at the edge of the supporting-plate, serves to depress the same, together with the stopper, so that the bottle is securely closed. By forcing the catch back the supporting-plate is released and the stopper can easily be withdrawn from the bottle.

What is claimed as the invention of the said WILLIAM MORGENSTERN is—

1. The stopper E, formed with a recess, *c*, beneath its head *d*, combined with the supporting-plate, having a hole to receive the head, substantially as set forth.

2. The stopper E and the projection upon the upper part thereof, made of elastic material, in combination with a plate, having an opening for the reception of said projection, substantially as set forth.

Signed by me this 7th day of February, A. D. 1877.

HENRY W. PUTNAM.

Witnesses:

GEO. T. PINCKNEY,

GEO. D. WALKER.